(12) United States Patent
Chen et al.

(10) Patent No.: US 9,245,459 B2
(45) Date of Patent: Jan. 26, 2016

(54) DISPLAY SCREEN AND DISPLAY SYSTEM THEREOF

(71) Applicant: National Tsing Hua University, Hsinchu (TW)

(72) Inventors: Cheng-Huan Chen, Hsinchu (TW); Po-Hung Yao, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/330,267

(22) Filed: Jul. 14, 2014

(65) Prior Publication Data

US 2015/0022077 A1    Jan. 22, 2015

(30) Foreign Application Priority Data

Jul. 16, 2013   (TW) .............................. 102125358 A

(51) Int. Cl.
*G02B 26/12* (2006.01)
*G09B 21/00* (2006.01)

(52) U.S. Cl.
CPC ..................................... *G09B 21/00* (2013.01)

(58) Field of Classification Search
CPC ......... F21K 9/135; F21K 9/56; F21V 3/0481; F21Y 2103/003; H01L 27/3244; H01L 33/50
See application file for complete search history.

(56) References Cited

U.S. PATENT DOCUMENTS

| | | | | |
|---|---|---|---|---|
| 5,289,012 | A  * | 2/1994 | Alvarez | 250/588 |
| 5,582,703 | A  * | 12/1996 | Sluzky et al. | 204/485 |
| 6,986,581 | B2 * | 1/2006 | Sun et al. | 353/31 |
| 2008/0291140 | A1* | 11/2008 | Kent et al. | 345/83 |
| 2009/0101930 | A1* | 4/2009 | Li | 257/98 |
| 2011/0249460 | A1* | 10/2011 | Kushimoto | 362/510 |

* cited by examiner

*Primary Examiner* — Tracie Y Green
(74) *Attorney, Agent, or Firm* — WPAT, PC; Justin King

(57) ABSTRACT

A display screen includes a substrate and a fluorescent material. The substrate includes a plurality of pixel regions arranged in an array, wherein each pixel region includes a fluorescent region and a transparent region, and the area of the transparent region is larger than the area of the fluorescent region. The fluorescent material is arranged in the fluorescent region and excited by an excitation light to emit a visible light to form an image. The above-mentioned display screen allows a viewer to see the images formed by the fluorescent region and the environmental image at the other side of display screen. A display system including the above-mentioned display screen is also disclosed.

28 Claims, 3 Drawing Sheets

DISPLAY SCREEN AND DISPLAY SYSTEM THEREOF

BACKGROUND OF THE INVENTION

1. Field of the Invention

The present invention relates to a display screen and a display system thereof, and more particularly, to a display screen and a display system thereof using an excitation light to excite a fluorescent material to form an image.

2. Description of the Prior Art

The Laser Phosphor Display (LPD) has the advantages of big size, low energy consumption and wide viewing angle and is gradually paid attention to in the market. The principle of the Laser Phosphor Display is using the laser beam generated by the laser engine to scan the phosphor panel, and the phosphor on the phosphor panel is excited by the laser beam to emit red/green/blue light and form an image. The phosphor on a conventional phosphor panel is arranged in adjacent strips, and the scanning direction of the laser beam is perpendicular to the phosphor strips to form the colorful pixels including red/green/blue light. As this structure, the conventional phosphor panel is opaque, and the viewer cannot see the background environment at the other side of the phosphor panel. This limits the application of the laser phosphor display. For example, if the phosphor panel is equipped on the shop windows to show the promotion information or the product introduction, the merchandise in the shop windows will not be seen by the consumers.

To sum up, it's a present target to enlarge the application of the laser phosphor display.

SUMMARY OF THE INVENTION

The present invention is directed to a display screen and the display system thereof. Each pixel region includes a fluorescent region and a transparent region, wherein the fluorescent region is excited by an excitation light to form an image. The display screen allows a viewer to see the environmental image at the other side of display screen through the transparent region. Hence, the application of the display system can be enlarged.

In one embodiment, the proposed display screen includes a substrate and a first fluorescent material. The substrate comprises a plurality of pixel regions arranged in an array, wherein each pixel region comprises a fluorescent region and a transparent region, and the area of the transparent region is larger than the area of the fluorescent region so as to allow a viewer at one side to see the other side of the display screen through the transparent region. The first fluorescent material is arranged in the fluorescent region, for an excitation light exciting the fluorescent region to make the first fluorescent material emitting a visible light of a first color to form an image.

In one embodiment, the proposed display system includes a display screen and an excitation device. The display screen comprises a substrate and a first fluorescent material. The substrate comprises a plurality of pixel regions arranged in an array, wherein each pixel region comprises a fluorescent region and a transparent region, and the area of the transparent region is larger than the area of the fluorescent region so as to allow a viewer at one side to see the other side of the display screen through the transparent region. The first fluorescent material is arranged in the fluorescent region, for an excitation light exciting the fluorescent region to make the first fluorescent material emitting a visible light of a first color to form an image.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Figure 1:
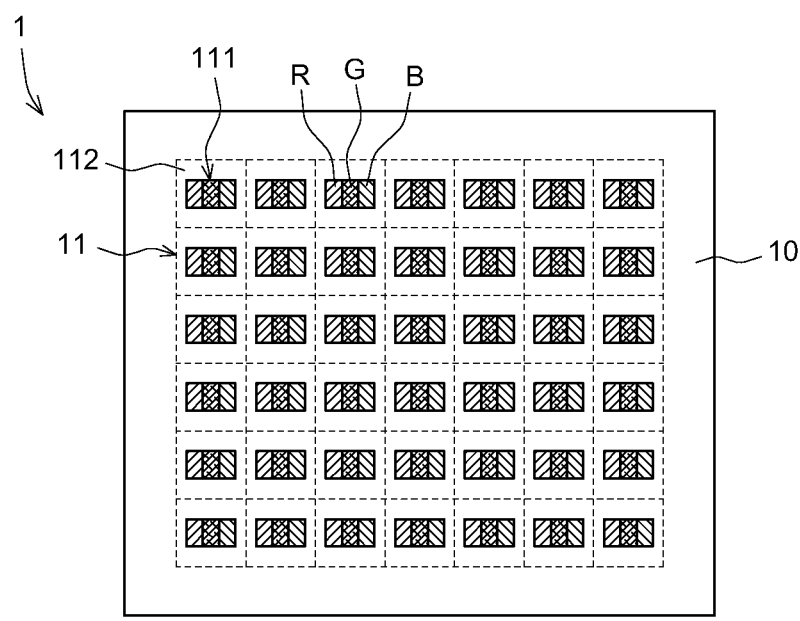
FIG. 1 is a schematic diagram schematically illustrating the display screen according to the first embodiment of the present invention.
Figure 2:
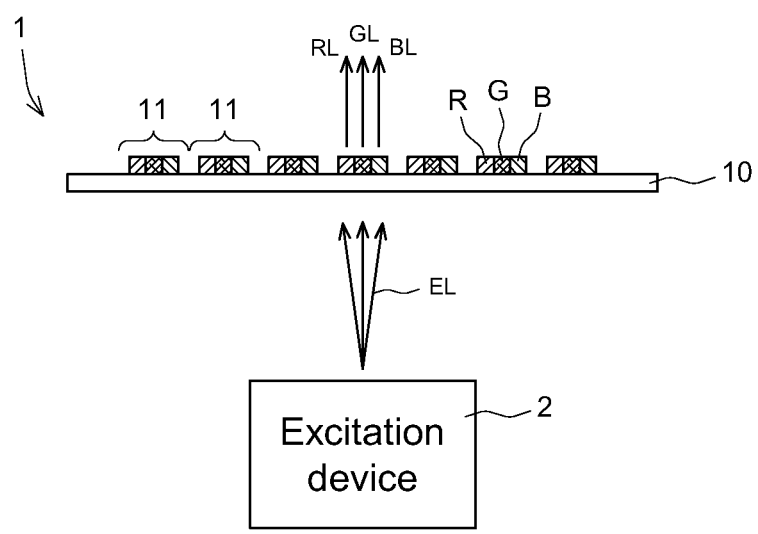
FIG. 2 is a schematic diagram schematically illustrating the display system according to one embodiment of the present invention.

Please refer to FIG. 1 and FIG. 2. The display system of one embodiment of the present invention comprises a display screen 1 and an excitation device 2. The display screen 1 comprises a substrate 10 and at least a fluorescent material. The substrate 10 comprises a plurality of pixel regions 11 arranged in an array, wherein each pixel region comprises a fluorescent region 111 and a transparent region 112. The fluorescent material is arranged in the fluorescent region 111. The excitation device 2 is used for providing an excitation light EL exciting the fluorescent region 111 to make the fluorescent material in the fluorescent region 111 emitting a visible light. For example, the excitation light EL can be a laser beam and the central wavelength can be blue light wavelength, violet light wavelength, ultraviolet light wavelength or less than 420 nm. In one word, the display system of the present invention utilizes the excitation light EL with shorter wavelength to excite the fluorescent material to emit the visible light with longer wavelength. The excitation device 2 modulates at least one of the strength of the excitation light EL and the time of exciting the fluorescent region to control the strength of the visible light emitted by the fluorescent material to form an image.

In one embodiment, the excitation device 2 can provide various methods to excite the fluorescent region 111 of each pixel region 11 to emit the visible light and form the image. For example, the excitation device 2 can provide a dot excitation light and progressively scan the fluorescent region 111 of each pixel region 11 to form the image. Further, the excitation device 2 can provide a dot excitation light of a one-dimensional array and scan the fluorescent region 111 of each pixel region 11 in the direction (horizontal or vertical direction) perpendicular to the one-dimensional array to form the image. Besides, the excitation device 2 can provide a dot excitation light of a two-dimensional array to correspondingly excite the fluorescent region 111 of each pixel region 11 to form the image.

In the embodiment, the fluorescent region 111 of each pixel region 11 is sequentially arranged three kinds of fluorescent materials R, G and B, along the scanning direction of the excitation light EL, wherein the fluorescent material R can absorb the excitation light EL and emit the red visible light RL; the fluorescent material G can absorb the excitation light EL and emit the green visible light GL; and the fluorescent material B can absorb the excitation light EL and emit the blue visible light BL. According to the actual requirements, but not limited to, one, two or more kinds of the fluorescent materials can be arranged in the fluorescent region 111, and various fluorescent materials can emit the visible light with different colors after being excited. For example, the fluorescent material can be excited by the blue excitation light and emit the white light. In another embodiment, the fluorescent material R and G can be excited by the blue excitation light with shorter wavelength and emit the red or green light with longer wavelength, and the region corresponding to the fluorescent material B can be replaced with a diffusion region. The diffusion region can directly diffuse the blue excitation light to provide the required blue light in each pixel region.

According to the above-mentioned structure, since the transparent region 112 has an optical nature of pure transmission, the viewer can see the environmental image at the other side of the display screen 1 through the transparent region 112. For example, when the shop window is utilized as the display screen 1 to show the promotion information or the product introduction, the merchandise in the shop windows can be still seen by the consumers through the transparent region 112. For another example, when the windshield of the vehicle is utilized as the display screen 1, the driver can see the vehicle information and the road situation at the same time.

It can be understood that the transparency of the display screen 1 can be controlled by adjusting the size of the transparent region 112. In one embodiment, the area of the transparent region 112 is larger than the area of the fluorescent region 111, and the transparent region 112 separates the fluorescent region 111 adjacent to the pixel region 11. In other words, each of the fluorescent regions in the pixel regions is separated by the transparent region in the same pixel region or by the transparent region in the adjacent pixel region. For example, when applied in the vehicle, to comply with the laws and regulations, the area of the transparent region 112 has to be at least 75% of the pixel region 11.

In one embodiment, for enhancing the color contrast of the display screen 1, the light absorption material can be mixed with the fluorescent material and arranged in the fluorescent region 111. For example, the light absorption material that can absorb the green and blue light and pass the red light is selected and mixed with the fluorescent material R, and then the fluorescent material R can emit a purer red visible light. Similarly, the light absorption material that can absorb the red and blue light and pass the green light is selected and mixed with the fluorescent material G, and then the fluorescent material G can emit a purer green visible light; the light absorption material that can absorb the red and green light and pass the blue light is selected and mixed with the fluorescent material B, and then the fluorescent material B can emit a purer blue visible light.

Figure 3:
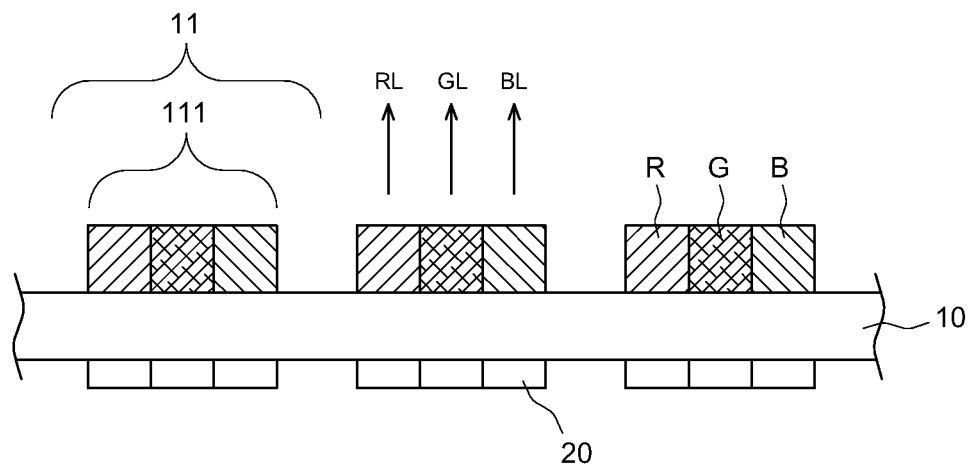
FIG. 3 is a schematic diagram schematically illustrating the display screen according to the second embodiment of the present invention.

Please refer to FIG. 3, in one embodiment, the display screen of the present invention further comprises a reflection layer 20, arranged corresponding to the fluorescent region 111. The reflection layer 20 is used for reflecting the visible light emitted by the fluorescent materials R, G and B to an emitting side, the side of the viewer seeing the images, of the fluorescent region 111. For example, the reflection layer 20 can allow the excitation light EL passing through and reflect the visible light RL, GL and BL.

Figure 4:
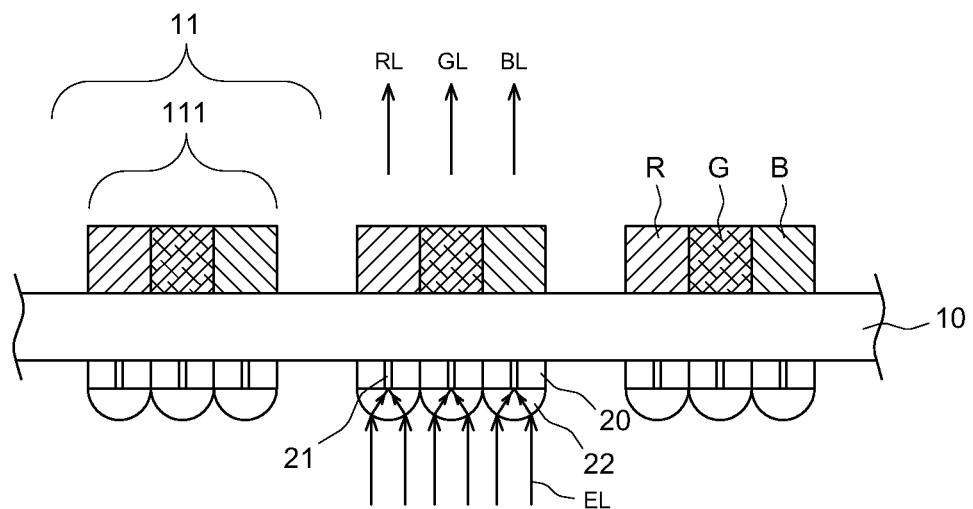
FIG. 4 is a schematic diagram schematically illustrating the display screen according to the third embodiment of the present invention.

In another embodiment, please refer to FIG. 4, the reflection layer 20 includes an aperture 21, for allowing the excitation light EL passing the aperture 21 to illuminate the fluorescent region 111 and excite the fluorescent materials R, G and B to emit the visible light RL, GL and BL. A portion of the visible light RL, GL and BL will be reflected to the emitting side of the fluorescent region 111 by the reflection layer 20.

Preferably, a lens structure 22 can be arranged corresponding to an injecting side of the fluorescent region 111. The lens structure 22 is used for focusing the excitation light EL to pass the aperture 21 and illuminate the fluorescent materials R, G and B in the fluorescent region 111.

Figure 5:
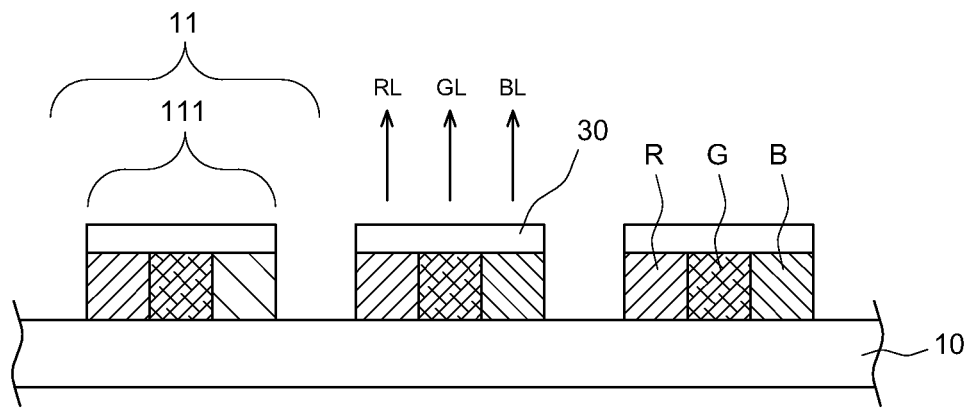
FIG. 5 is a schematic diagram schematically illustrating the display screen according to the fourth embodiment of the present invention.

Please refer to FIG. 5, in one embodiment, the display screen of the present invention further comprises a light filtering layer 30, arranged corresponding to the emitting side of the fluorescent region 111. The light filtering layer 30 is used for filtering the excitation light EL and allowing the visible light RL, GL and BL passing through. Preferably, the excitation light EL can be reflected to the fluorescent region 111 and excites the fluorescent materials R, G and B by the light filtering layer 30. In one embodiment, the light filtering layer 30 can be arranged in the transparent region 112 to filter the excitation light EL and prevent the excitation light EL from emitting to the viewer from the transparent region 112.

Figure 6:
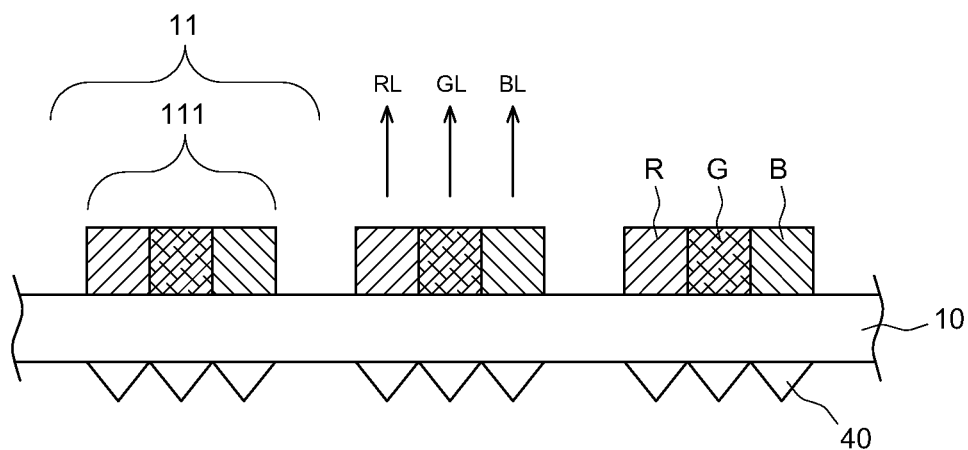
FIG. 6 is a schematic diagram schematically illustrating the display screen according to the fifth embodiment of the present invention.

Please refer to FIG. 6, in one embodiment, the display screen of the present invention further comprises an optical microstructure 40, arranged corresponding to an injecting side of the fluorescent region 111. The optical microstructure 40 is used for deflecting the excitation light EL to make the excitation light EL substantially perpendicular to the substrate 10, which also means facing the light emitting direction of the fluorescent region 111. For example, the optical microstructure 40 can be similar to a Fresnel lens used for guiding the excitation light EL of different injecting angles to be substantially perpendicular to the substrate 10.

In sum, the present invention provides the display screen and the display system thereof. Each pixel region includes a fluorescent region and a transparent region, and each fluorescent region is separated by the transparent region. According to this structure, the fluorescent region can be excited by the excitation light to form an image, and the viewer can see the environmental image at the other side of the display screen through the transparent region. Hence, the application of the display system can be enlarged.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the scope of the appended claims.

What is claimed is:

1. A display screen, comprising:
   a substrate, comprising a plurality of pixel regions arranged in an array, wherein each pixel region comprises a fluorescent region and a transparent region, and the area of the transparent region is larger than the area of the fluorescent region so as to allow a viewer at one side to see the other side of the display screen through the transparent region; and a first fluorescent material, arranged in the fluorescent region, for an excitation light exciting the fluorescent region to make the first fluorescent material emitting a visible light of a first color to form an image.

2. The display screen of claim 1, wherein the fluorescent regions in the pixel regions are separated by the transparent region in the pixel region or the transparent region in the adjacent pixel region.

3. The display screen of claim 1, further comprising:
a second fluorescent material, arranged in the fluorescent region adjacent to the first fluorescent material, for absorbing the excitation light to emit a visible light of a second color, wherein the first color and the second color are different.

4. The display screen of claim 1, further comprising:
a second fluorescent material, arranged in the fluorescent region adjacent to the first fluorescent material, for absorbing the excitation light to emit a visible light of a second color; and
a third fluorescent material, arranged in the fluorescent region adjacent to the second fluorescent material, for absorbing the excitation light to emit a visible light of a third color, wherein the first color, the second color and the third color are different.

5. The display screen of claim 4, further comprising:
a first light absorption material, mixed with the first fluorescent material, for absorbing the visible light of the second color and the third color and passing the visible light of the first color;
a second light absorption material, mixed with the second fluorescent material, for absorbing the visible light of the first color and the third color and passing the visible light of the second color; and
a third light absorption material, mixed with the third fluorescent material, for absorbing the visible light of the first color and the second color and passing the visible light of the third color.

6. The display screen of claim 1, wherein each pixel region further comprises a diffusion region adjacent to the fluorescent region for diffusing the excitation light.

7. The display screen of claim 1, wherein the central wavelength of the excitation light is blue light wavelength, violet light wavelength, ultraviolet light wavelength or less than 420 nm.

8. The display screen of claim 1, further comprising:
a reflection layer, arranged corresponding to the fluorescent region, for reflecting the visible light of the first color to an emitting side of the fluorescent region.

9. The display screen of claim 1, further comprising:
a reflection layer, arranged corresponding to the fluorescent region, for reflecting the visible light of the first color to an emitting side of the fluorescent region, wherein the reflection layer includes an aperture, for allowing the excitation light passing the aperture to illuminate the fluorescent region.

10. The display screen of claim 9, further comprising:
a lens structure, arranged corresponding to an injecting side of the fluorescent region, the lens structure is used for focusing the excitation light to pass the aperture.

11. The display screen of claim 1, further comprising:
a light filtering layer, arranged corresponding to an emitting side of the fluorescent region, the light filtering layer is used for filtering the excitation light.

12. The display screen of claim 1, further comprising:
an optical microstructure, arranged corresponding to an injecting side of the fluorescent region, the optical microstructure is used for deflecting the excitation light to make the excitation light perpendicular to the substrate.

13. A display system, comprising:
a display screen, comprising:
a substrate, comprising a plurality of pixel regions arranged in an array, wherein each pixel region comprises a fluorescent region and a transparent region, and the area of the transparent region is larger than the area of the fluorescent region so as to allow a viewer at one side to see the other side of the display screen through the transparent region; and
a first fluorescent material, arranged in the fluorescent region; and
an excitation device, for providing an excitation light exciting the fluorescent region to make the first fluorescent material emitting a visible light of a first color to form an image.

14. The display system of claim 13, wherein the fluorescent regions in the pixel regions are separated by the transparent region in the pixel region or the transparent region in the adjacent pixel region.

15. The display system of claim 13, wherein the display screen further comprising:
a second fluorescent material, arranged in the fluorescent region adjacent to the first fluorescent material, for absorbing the excitation light to emit a visible light of a second color, wherein the first color and the second color are different.

16. The display system of claim 13, wherein the display screen further comprising:
a second fluorescent material, arranged in the fluorescent region adjacent to the first fluorescent material, for absorbing the excitation light to emit a visible light of a second color; and
a third fluorescent material, arranged in the fluorescent region adjacent to the second fluorescent material, for absorbing the excitation light to emit a visible light of a third color, wherein the first color, the second color and the third color are different.

17. The display system of claim 16, wherein the display screen further comprising:
a first light absorption material, mixed with the first fluorescent material, for absorbing the visible light of the second color and the third color and passing the visible light of the first color;
a second light absorption material, mixed with the second fluorescent material, for absorbing the visible light of the first color and the third color and passing the visible light of the second color; and
a third light absorption material, mixed with the third fluorescent material, for absorbing the visible light of the first color and the second color and passing the visible light of the third color.

18. The display system of claim 13, wherein each pixel region of the display screen further comprises a diffusion region adjacent to the fluorescent region for diffusing the excitation light.

19. The display system of claim 13, wherein the central wavelength of the excitation light is blue light wavelength, violet light wavelength, ultraviolet light wavelength or less than 420 nm.

20. The display system of claim 13, wherein the display screen further comprising:
a reflection layer, arranged corresponding to the fluorescent region, for reflecting the visible light of the first color to an emitting side of the fluorescent region.

21. The display system of claim 13, wherein the display screen further comprising:
a reflection layer, arranged corresponding to the fluorescent region, for reflecting the visible light of the first color to an emitting side of the fluorescent region, wherein the reflection layer includes an aperture, for allowing the excitation light passing the aperture to illuminate the fluorescent region.

22. The display system of claim 21, wherein the display screen further comprising:
a lens structure, arranged corresponding to an injecting side of the fluorescent region, the lens structure is used for focusing the excitation light to pass the aperture.

23. The display system of claim 13, wherein the display screen further comprising:
a light filtering layer, arranged corresponding to an emitting side of the fluorescent region, the light filtering layer is used for filtering the excitation light.

24. The display system of claim 13, wherein the display screen further comprising:
an optical microstructure, arranged corresponding to an injecting side of the fluorescent region, the optical microstructure is used for deflecting the excitation light to make the excitation light perpendicular to the substrate.

25. The display system of claim 13, wherein the excitation device modulates at least one of the strength of the excitation light and the time of exciting the first fluorescent material to control the strength of the visible light of the first color.

26. The display system of claim 13, wherein the excitation device provides a dot excitation light, and progressively scans the fluorescent region of each pixel region.

27. The display system of claim 13, wherein the excitation device provides a dot excitation light of a one-dimensional array, and scans the fluorescent region of each pixel region in the direction perpendicular to the one-dimensional array.

28. The display system of claim 13, wherein the excitation device provides a dot excitation light of a two-dimensional array to correspondingly excite the fluorescent region of each pixel region.

* * * * *